US005625891A

United States Patent [19]

Tucker et al.

[11] Patent Number: 5,625,891

[45] Date of Patent: Apr. 29, 1997

[54] ENCLOSURE FOR TUNING PAGING RECEIVERS

[76] Inventors: Dominic Tucker; Ferdinand Aguinaldo, both of P.O. Box 4601, Inglewood, Calif. 90309

[21] Appl. No.: 345,851

[22] Filed: Nov. 28, 1994

[51] Int. Cl.$^6$ .................... H04B 17/00

[52] U.S. Cl. .................... 455/67.2; 455/67.7; 455/226.4

[58] Field of Search .................... 455/67.1, 67.2, 455/67.3, 67.4, 67.7, 115, 154.1, 155.1, 158.1, 158.2, 158.3, 158.4, 226.1–226.4, 228, 266, 351; 340/825.44

[56] References Cited

U.S. PATENT DOCUMENTS

| | | | |
|---|---|---|---|
| 3,273,150 | 9/1966 | Emerson | 455/67.2 X |
| 3,467,867 | 9/1969 | Armes et al. | 455/226.4 |
| 4,006,420 | 2/1977 | Schittko | 455/226.4 |
| 4,160,211 | 7/1979 | Wittrock | 455/226.4 |
| 4,817,196 | 3/1989 | MacNak et al. | 455/154.1 X |

*Primary Examiner*—Reinhard J. Eisenzopf
*Assistant Examiner*—Philip J. Sobutka
*Attorney, Agent, or Firm*—Albert O. Cota

[57] ABSTRACT

A pager tuning system (10) that allows an electronic pager (90) to be tuned without having to perform the tuning within a certified screen room. The system (10) is housed within an enclosure (12) that includes an electronics module (36) having an upper cavity structure (40) and a lower printed circuit board (PCB). The PCB has mounted, with the exception of a frequency counting unit (FC1), all the elements that comprise the system's electronics circuit (80). The upper cavity structure (40) has a sufficient depth to contain and secure the electronic pager (90) and includes an antenna wire (66) that functions as an antenna coupler. The antenna coupler interfaces with the pager's receiving antenna (92) when the pager (90) is inserted into the cavity structure (40). The electronics circuit (80) consists of a first 70 MHz band-pass filter (F1) having an input that is connected to the antenna wire (66) and an output that is applied to an R.F. amplifier (U1). The amplifier optimizes the 70 MHz signal before it is applied to a second 70 MHz band-pass filter (F2) where the signal is further refined before application to the frequency counting unit (FC1). The frequency counting unit (FC1) includes a liquid crystal display where the frequency of the pager being adjusted is displayed.

16 Claims, 3 Drawing Sheets

ENCLOSURE FOR TUNING PAGING RECEIVERS

TECHNICAL FIELD

The invention pertains to the general field of pager tuning systems and more particularly to a portable pager tuning system.

BACKGROUND ART

The use of pagers in today's society is wide spread and is increasing rapidly. Pagers are designed to operate at a frequency that is dependent upon the geographical location where the pager is to be used. For example, a pager that is to be used in the Los Angeles area would have a different frequency than a pager that is used in the Washington, D.C. area.

If a person that has been living in the Los Angeles area is transferred to the Washington D.C. area, it is necessary that the pager frequency be tuned to the specific frequency assigned to the Washington D.C. area. Presently to accomplish this frequency "retuning", it is necessary that the pager be taken to a pager retainer that in turn, sends the pager to a pager tuning facility. The pager tuning facilities include test equipment and other instrumentation that must be used with a certified non-electromagnetic interference (EMI) screen room where the pager tuning takes place.

The instant invention allows the pager "retuning" to be accomplished at a location without the need for a screen room or additional test equipment and instrumentation. Thus, a pager retainer having one of the inventive pager tuning systems can retune a pager at a retail facility. Thus, saving time and cost to the pager user; and providing a greater profit margin for the retailer.

A search of the prior art did not disclose any patents that read directly on the claims of the instant invention however, the following U.S. patents were considered related:

| U.S. Pat. No. | INVENTOR | ISSUED |
|---|---|---|
| 5,196,842 | Gomez | 23 March 1993 |
| 5,115,217 | McGrath | 19 May 1992 |

The Gomez U.S. Pat. No. 5,196,842 discloses a pager capable of operating in a plurality of paging systems. The pager includes a receiver for receiving information messages which include idle words from one of the paging systems. Upon receiving the messages, the pager decodes the message to determine the system identification information contained in the idle word. The pager then compares the decoded system identification information with the unique paging system identification number presently being utilized by the pager. If the system identification information matches the unique paging system identification number, the pager remains in the present paging system. If the data does not match, the pager determines if any of the stored sets of system configuration parameters matches the decoded system identification information. If a match is found, a controller automatically changes the system configuration parameters to match those associated with the new paging system identification number.

The McGrath U.S. Pat. No. 5,115,217 discloses a tuning element for planar R.F. circuits. The tuning element includes a substrate, a transmission line on the substrate that includes a pair of conductors coupled to a circuit to be tuned, and a movable short-circuit element for varying the impedance the transmission line presents to the circuit to be tuned. The movable short-circuit element includes a dielectric layer disposed atop the transmission line and a distributed shorting element in the form of a conductive member that is configured to be slid along at least a portion of the transmission line. The conductive member is configured to span the conductors of the transmission line and to define an opening that spans and separates the two conductors. The conductive member combines with the transmission line to form low impedance sections of transmission line, and the opening combines with the transmission line and the dielectric layer to form a first high impedance section of transmission line. The low impedance section and the high impedance section have a wavelength that provides a periodic variation of transmission line impedance that enhances reflection of the R.F. power.

For background purposes and as indicative of the art to which the invention relates, reference may be made to the following remaining patents found in the search.

| PATENT NO. | INVENTOR | ISSUED |
|---|---|---|
| 4,320,561 | Cook, et al | 14 June 1994 |
| 5,262,769 | Holmes | 16 November 1993 |
| 5,255,273 | Nilsson et al | 19 October 1993 |
| 4,723,302 | Fulmer et al | 2 February 1988 |

DISCLOSURE OF THE INVENTION

The pager tuning system is designed to allow an electronic pager to be tuned or retuned without having to perform the tuning within a certified screen room. In its most basic design, the pager tuning system consists of a system enclosure that houses a power supply, a frequency counting unit and an electronics module that contains all the remaining elements of an electronics circuit that operates the system.

The system enclosure features a cavity structure that is located at a sufficient depth to contain and secure the electronic pager. The cavity structure includes an antenna coupler that interfaces with the receiving antenna on the pager when the pager is inserted into the cavity structure. Thus, no hard wiring or a mechanical connector is required to allow the pager to make an electrical connection with the system.

The electronic circuit which is housed within the electronics module, consists of a first 70 MHz band-pass filter having an input that is connected to the antenna coupler located within the cavity structure. The first band-pass filter is designed to pass a 70 MHz signal provided by the electronic pager. From the first 70 MHz band-pass filter, the signal is applied to an R.F. amplifier that amplifies and optimizes the 70 MHz signal. A second 70 MHz band-pass filter is then used to receive and further refine the amplified 70 MHz signal from the R.F. amplifier. From the amplifier, the 70 MHz signal is applied to the frequency counting unit which has circuit means for processing the 70 MHz signal received from the second 70 MHz band-pass filter.

The frequency counting unit produces an output signal that drives an internal LCD display. The display displays the pager's operating frequency as being adjusted by a technician rotating a frequency adjust control located on the electronic pager.

The power supply for the pager tuning system can consist of either an internal battery or an external power source. When using an external power source, the system enclosure includes on a side panel a male power-input jack that includes an inward, output section and an outward, input section. The output section is connected to an input terminal of a voltage regulator that further comprises an element of the electronics circuit. The external power supply utilizes a conventional wall-plus power adapter. This adapter has an input plug that is inserted into a 120 volts a-c utility power receptacle, and a cable having a female connector that attaches to the male power-input jack on the system's side panel. When attached, d-c power is applied to the voltage regulator, which then supplies a regulated d-c voltage that is applied to the electronics circuit.

In view of the above disclosure, it is the primary object of the invention to provide a pager tuning system that allow electronic pagers to be tuned at remote locations without the need for having to perform the tuning within a certified screen room.

In addition to the primary object of the invention it is also an object of the invention to have a system that:

1. is dimensioned to be easily hand carried and stored,
2. can be designed to tune electronic pagers manufactured by various manufacturers, and especially pagers manufactured by the Motorola Company,
3. allows the electronic pager to be electrically connected to the system by just placing the pager into a pager cavity located on the system enclosure,
4. has all the electronic circuits, with the exception of a separate frequency counting unit, located in an electronics module that is easily removed when maintenance is required,
5. is reliable, and
6. is cost effective from both a manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
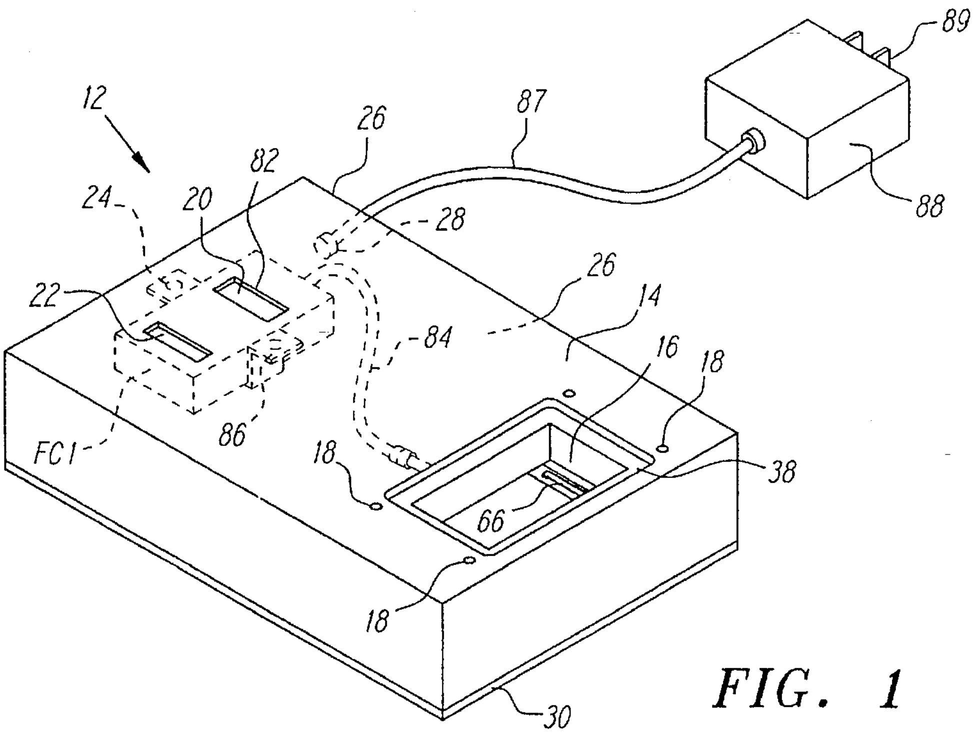
FIG 1 is a perspective view of the pager tuning system showing the location of the cavity structure opening, the frequency counting unit FC1 and a power supply consisting of a wall plus power adapter.

The best mode for carrying out the pager tuning system 10 is presented in terms of a preferred embodiment that is designed to tune or retune electronic pagers 90 to the assigned local area frequency. The preferred embodiment as shown in FIGS. 1–6 is comprised of the following major elements: a system enclosure 12, an electronics module 36 that contains an electronics circuit 80 that is comprised of a first 70 MHz band-pass filter F1, an R.F. amplifier U1, a second 70 MHz band-pass filter F2, a frequency counting unit FC1, a voltage regulator VR1 and a wall-plug power adapter 88.

The system 10 operates with electronic pagers 90 that include a receiving antenna 92 and a frequency adjust control 94. In particular, the system 10 is designed to tune pagers that are manufactured by the Motorola Company®. However, other similar pagers manufactured by other companies can also be tuned by the system. The design of the system 10 also allows electronic pagers 80 to be tuned or retuned without having to perform the tuning procedure within a certified screen room that is free of radio frequency interferences (RFI).

The pager tuning system 10 is housed within an enclosure 12 as shown in FIG. 1, that is designed to be portable and operated in various locations. In the preferred embodiment, the housing has a length of 10 inches (25.5 cm), a width of 6 inches (15.3 cm) and a height of 2 inches (5.1 cm). The top of the enclosure serves as a front panel 14 that includes on one side a cavity structure opening 16 having on each corner a mounting bore 18. On the opposite end of the front panel 14 are located openings that correspond to the controls of the frequency counting unit FC1. These openings include a digital display opening 20, a switch control opening 22 and a pair of mounting bores 24 through which are inserted a set of bolts and nuts that attach a bracket 86 that retains the frequency counting unit FC1 as shown in FIG. 1. On the back side panel 26 of the enclosure is located a male power-input jack 28 that is used to connect an external power supply as described infra. The bottom of the enclosure 12 has a removable bottom panel 30 that when removed allows access to the electronics module 36 when maintenance is required.

Figure 2:
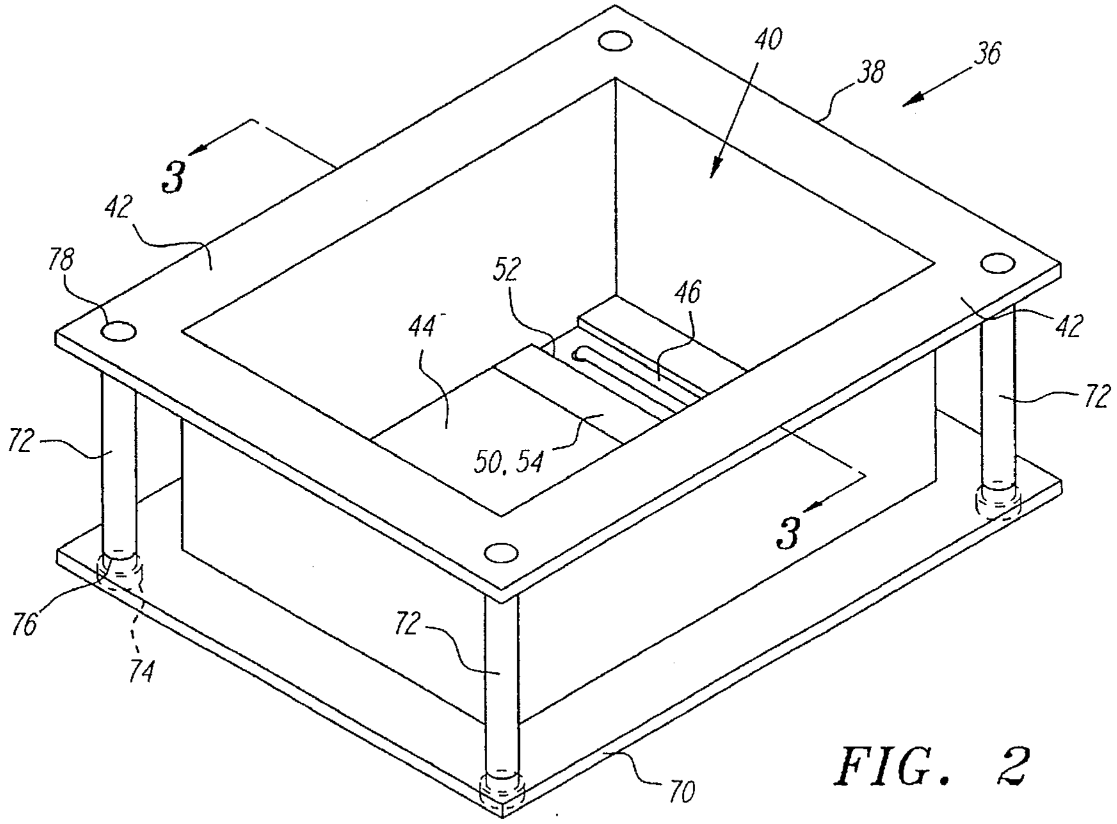
FIG. 2 is a perspective view of the electronics module.

The electronic module 36 which is shown attached to the enclosure 12 in FIG. 1 and separated in FIG. 2 consists of an upper section 38 and a lower section 70.

Figure 3:
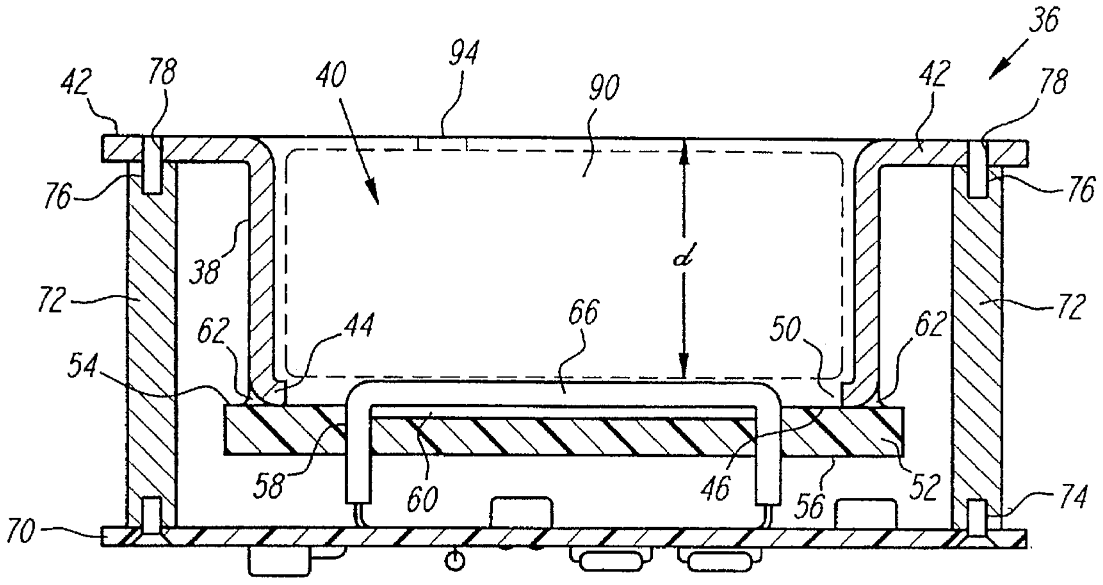
FIG. 3 is a sectional view taken alone the lines 3—3 of FIG. 2.

The upper section 38 consists of a cavity structure 40 having an upper surface that consists of an integral lip 42 that completely surrounds the top of the cavity opening as best shown in FIG. 2. The cavity structure 40 also has a bottom surface 44 that itself has a rear surface 46. The bottom surface 44 is at a cavity depth "d" as shown in FIGS. 2 and 3, that is sufficient to completely encompass and securely contain the electronics pager 90. Through the bottom and rear surfaces 44,46 is located an antenna substrate opening 50 as also shown in FIGS. 2 and 3.

To complete the upper section 38 of the electronics module 36, an insulated antenna substrate 52 having an upper surface 54 and a lower surface 56 is utilized. Extending across the width of the antenna substrate 52 are a pair of antenna bores 58 that have between them, on the substrate's upper surface 54, an antenna channel 60. The two bores 58 and channel 60 are dimensioned to fit within the width of the structure cavity 40 as also shown in FIGS. 2 and 3. The upper surface 54 of the structure 52 is attached to the rear surface 46 of the cavity structure 40, over the antenna substrate opening 50, by an attachment means 62 that preferably consists of an adhesive. Through the two antenna bores 58 and within the antenna channel 60, as shown in FIG. 3, is located an insulated wire 66 that functions as an antenna coupler as described infra. The two wire ends project out the lower surface 56 of the antenna substrate 52 from where they are attached to the first 70 MHz band-pass filter F1 as also described infra.

The lower section 70 of the electronics module 36 consists of a printed circuit board (PCB) as shown in FIGS. 2 and 3. The PCB is attached by means of standoffs 72 and bolts 74. The standoffs are located on each corner of the electronics module 36 with the lower end of each standoff 72 bolted to corresponding bores 76 on the corner of the PCB. The top of the standoffs 72 interface with a set of bores 76 located at each corner of the lip 42 which in turn, are aligned with the set of mounting bores 18 located on each corner of the cavity structure opening 16 on the system enclosure 12. To secure the electronics module 36 to the enclosure 12, a set of bolts 74 are inserted through the bores 18,78 and into the upper end of the standoffs 72. To the PCB is attached the elements that comprise the electronics circuit 80.

Figure 4:
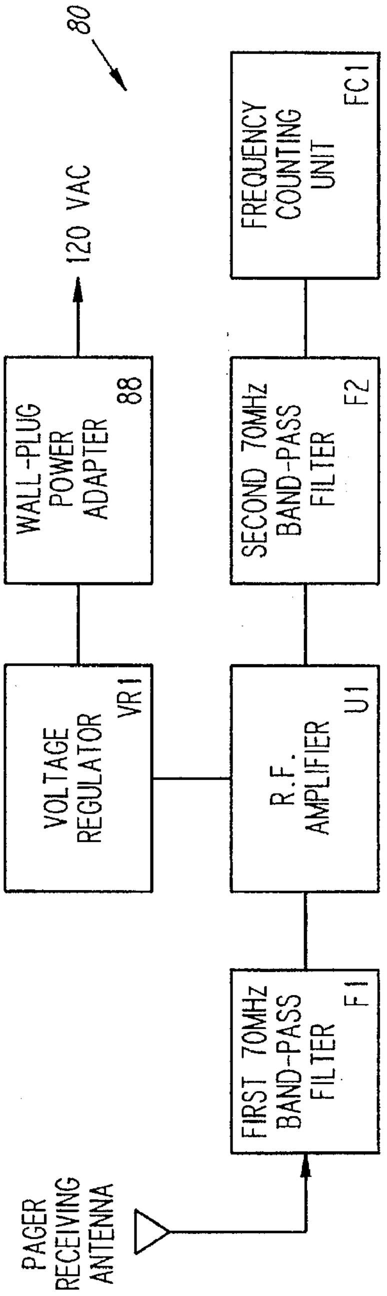
FIG. 4 is a block diagram of the electronics circuit.
Figure 5:
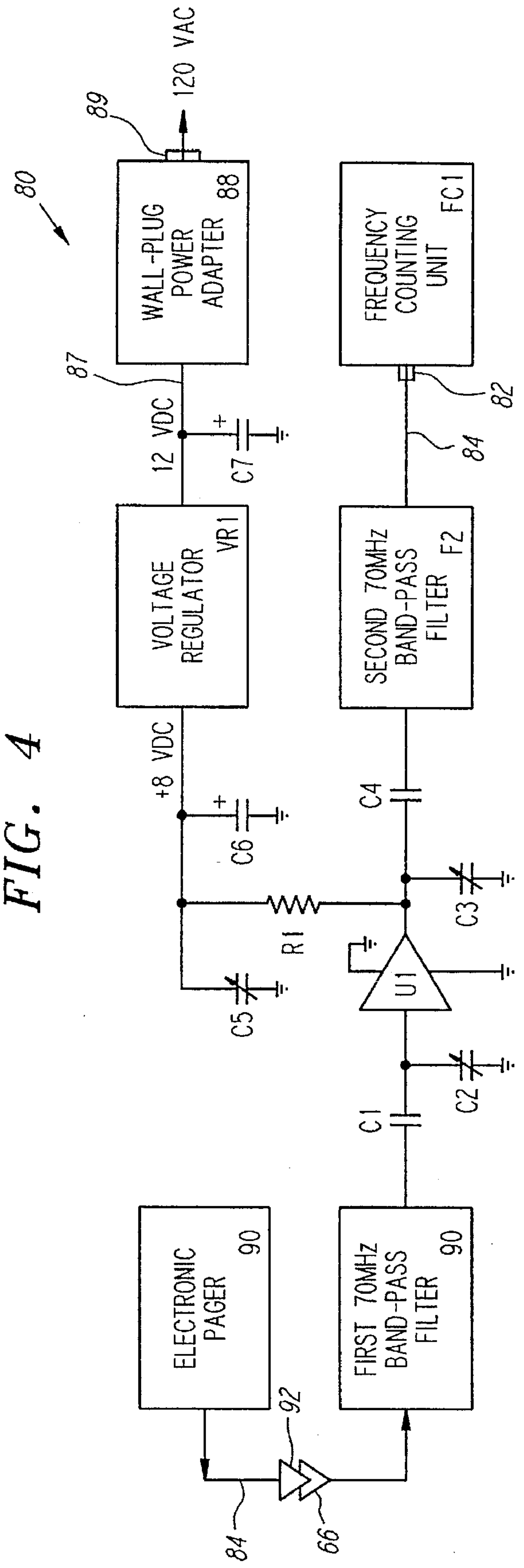
FIG. 5 is a schematic diagram of the electronics circuit.

The electronics circuit 80 as shown in a block diagram in FIG. 4 and schematically in FIG. 5, is comprised of the first 70 MHz band-pass filter F1, the RF amplifier U1, the second 70 MHz band-pass filter F2, the frequency counting unit FC1 and the voltage regulator VR1.

The first 70 MHz band-pass filter F1 has an input that is connected to the antenna wire 66 that projects through the insulated antenna substrate 52 as shown in FIG. 3. The antenna wire 66, which functions as the antenna coupler, is in turn coupled to the receiving antenna 92 of the electronic pager 90 when the pager is inserted into the cavity structure 40. When the electronic pager 90 is placed in a test mode, the pager produces a 70 MHz signal that is applied through the antenna coupler 66. The first 70 MHz band-pass filter processes this signal and produces a filtered 70 MHz signal that is applied through a coupling capacitor C1 to the input of the RF amplifier U1. This amplifier has at its input a first variable capacitor C2 and at its output is located a second variable capacitor C3. The two capacitors C2,C3 are impedance matching capacitors that allow the amplifier impedance to the optimally adjusted to pass the 70 MHz signal at a maximum gain.

The output of the RF amplifier U1 is applied through a coupling capacitor C4 to the second 70 MHz band-pass filter F2 where the signal is further refined to produce the required 70 MHz signal that is used to drive the frequency counting unit FC1.

Figure 6:
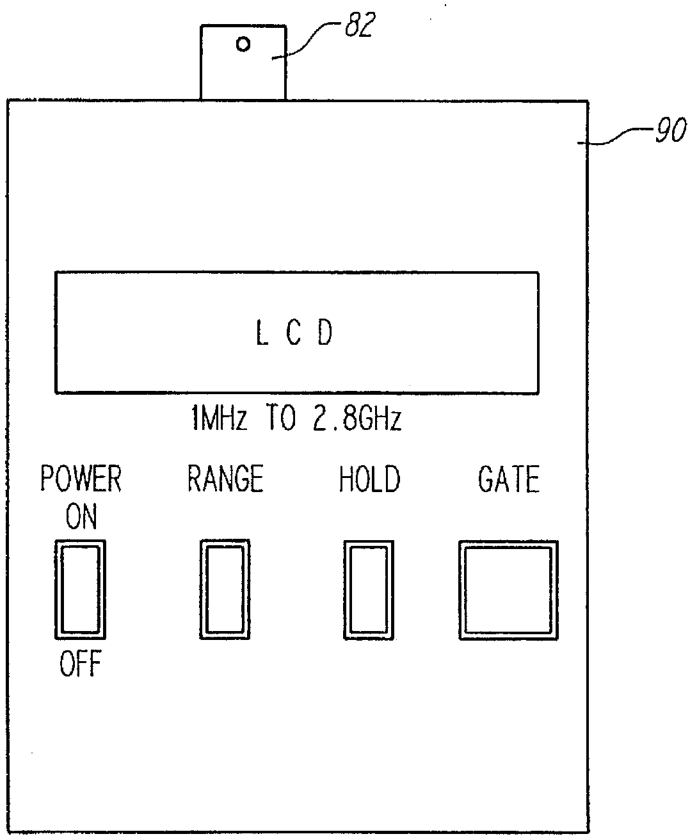
FIG. 6 is a top plan view of the Model 3000 frequency counting unit.

The frequency counting unit FC1 as shown in FIG. 6, is a separate unit having an input 82 that is connected to the 70 MHz output from the second 70 MHz band-pass filter F2 by means of a coaxial cable 84 as shown in FIGS. 1 and 5. The frequency counting unit FC1 can be comprised of any frequency counting unit. However, the unit is preferably comprised of a Model 3300 Minicounter manufactured by Optoelectronics, Inc., located in Fort Lauderdale, Fla. The Model 3300 operates from an internal battery and has a front panel that includes as shown in FIG. 6, a 10-digit liquid crystal display (LCD) from where the operating frequency of the electronic pager 90, that is being adjusted by a technician rotating the frequency adjust control 94, is displayed, a POWER: ON-OFF switch, a RANGE switch that allows a frequency ranging from 1 MHz to 2.8 GHz to be selected, a HOLD switch that when pressed, causes the pager's operating frequency to remain locked on the LCD display, and a GATE switch that when pressed, increases the resolution of the pager's displayed operating frequency, The frequency counting unit FC1 is attached to the lower surface of the front panel 14, over the digital display opening 20 and switch openings 22, by a bracket 86. The bracket as shown in FIG. 1 is fastened to the enclosure front panel 14 by means of bolts and nuts that are inserted through a pair of mounting bores 24.

The pager tuning system 10 is designed to be powered by a power supply that can consist of either an internal 9-volt battery (not shown) or an external power supply.

The external power supply requires that on the back side panel 26 of the enclosure 14 is located a male power input jack 28. This jack includes an inward, output section and an outward, input section. The output section is connected to the voltage regulator VR1 as shown in FIGS. 4 and 5. The input section is connected via a cable 87 to a wall-plug adapter 88 as shown in FIG. 1. The adapter 88 has an input plug 89 that is inserted into an a-c utility power receptacle. When attached, d-c power is applied to the voltage regulator VR1, through resistor R1 and decoupling capacitors C5, C6 and C7. The regulator then supplies a regulated 12-volt d-c voltage that is applied to the electronics circuit.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

We claim:

1. A pager tuning system comprising:

a) an electronic pager that includes a receiving antenna and a frequency adjust control, b) a system enclosure having a cavity structure that includes a bottom surface that further has a rear surface and that is located at a sufficient depth to contain and secure said pager, with said cavity structure having an antenna coupler that interfaces with the receiving antenna on said pager when said pager is inserted into said cavity structure, c) an electronics circuit comprising:

(1) a first 70 MHz band-pass filter F1 having an input that is connected to the antenna coupler on said cavity structure and that is designed to pass a 70 MHz signal provided by said electronic pager, (2) an R.F. amplifier U1 that amplifies the 70 MHz signal received from said band-pass filter F1, (3) a second 70 MHz band-pass filter F2 that receives and further refines the amplified 70 MHz signal from said R.F. amplifier U1, (4) a frequency counting unit FC1 having circuit means for receiving and processing the 70 MHz signal from said second 70 MHz band-pass filter F2 and producing an output signal that drives an LCD display that displays the pager's operating frequency as set by the frequency adjust control located on said electronic pager, and (5) a power supply that supplies the required power to said electronics circuit.

2. The system as specified in claim 1 wherein said system is portable and is designed to be operated external to a certified screen room.

3. The system as specified in claim 1 wherein said antenna coupler comprises:

a) said cavity structure having an antenna block opening through the structure's bottom surface, and b) an insulated antenna substrate that is attached to the rear surface over the antenna substrate opening, with said antenna substrate having a pair of bores therethrough that extend across the width of said insulated antenna substrate and within the width of said cavity structure, where the bores are sized to receive a wire which functions as said antenna coupler.

4. The system as specified in claim 1 wherein said R.F. amplifier U1 further comprises a first variable capacitor C2 located at the input and a second variable capacitor C3 located at the output, where said variable capacitors are adjusted to match the input and output impedance respectively of said amplifier U1 to allow said amplifier to pass the 70 MHz signal from said band-pass filter F1 at a maximum gain.

5. The system as specified in claim I wherein said power supply comprises a 9-volt battery that is housed within said system enclosure.

6. The system as specified in claim 1 wherein said power supply comprises:

a) said system enclosure further comprising a side panel having therethrough a male power-input jack that includes an inward, output section and an outward, input section where the output section is connected to an input terminal of a voltage regulator that further comprises an element of said electronics circuit, b) a wall-plug power adapter having:

(1) an input plug that is inserted into an a-c utility power receptacle, and (2) a cable having a female connector that attaches to the male power connector on said system enclosure, where when attached, d-c power is applied to said voltage regulator, which then supplies a regulated d-c voltage that is applied to said electronics circuit.

7. The system as specified in claim 1 wherein said electronics circuit is contained within an electronics module comprising:

a) an upper section that is comprised of said cavity structure, and b) a lower section consisting of a printed circuit board (PCB) that has attached the elements comprising said electronics circuit, where said PCB is attached, by means of standoffs and bolts, to said cavity structure.

8. The system as specified in claim 7 wherein said enclosure further comprising a front panel having a cavity structure opening that is dimensioned to receive and attach the upper section of said electronics module.

9. The system as specified in claim 8 wherein said system enclosure further comprises a removable bottom panel that when removed allows access to said electronics module.

10. The system as specified in claim I wherein said frequency counting unit comprises a front panel having a 10-digit LCD display from where the operating frequency of the pager is displayed, a POWER: ON-OFF switch, a RANGE switch that allows frequencies ranging from 1 MHz to 2.8 GHz to be selected, a HOLD switch that when pressed, causes the LCD display to remain locked on the pager's operating frequency and a GATE switch that when pressed increases the resolution of the pager displayed operating frequency.

11. The system as specified in claim 10 wherein said frequency counting unit is comprised of a Model 3300 Minicounter manufactured by Optoelectronics, Inc., located In Fort Lauderdale, Fla.

12. A pager tuning system comprising:

a) an electronic pager that includes a receiving antenna and a frequency adjust control, b) an electronics module comprising:

(1) an upper section having:

(a) a cavity structure having an upper surface consisting of an integral lip that surrounds the top of the cavity opening, with said cavity having a bottom surface having a rear surface and a cavity depth "d" that completely encompasses and securely contains said electronics pager, with the bottom surface of said cavity further having an antenna substrate opening that extends across the width of the structure's bottom surface, (b) an insulated antenna substrate comprising an upper surface and a lower surface, with said antenna substrate having a pair of bores therethrough that extend across the width of said insulated antenna substrate with the upper surface of said insulated antenna substrate further having a channel located between the two antenna bores, where the upper surface of said insulated substrate is attached to the rear surface of said cavity substrate by an attachment means, where when attached, the two antenna bores and channel extend across and within the width of said cavity structure, and (c) an insulated wire, which functions as an antenna coupler, and that is inserted through the antenna bores with the wire resting within the channel and with the respective ends of the wire projecting through the two antenna bores and out the lower surface of said insulated antenna substrate, where when said pager is inserted into said pager cavity, the receiving antenna on said pager interfaces with said antenna coupler (2) a lower section consisting of a printed circuit board (PCB) that is attached, by means of standoffs and bolts to the lower surface of the integral lip surrounding said cavity structure, where to said PCB is attached an electronics circuit comprising:

(a) a first 70 MHz band-pass filter. F1 having an input that is connected to the antenna coupler on said insulated antenna substrate and that is designed to pass and filter a 70 MHz signal that is provided by said electronic pager when said pager is placed in a test mode, (b) an R.F. amplifier U1 that receives the filtered 70 MHz signal from said band-pass filter F1 through a coupling capacitor C1, where said amplifier U1 has at the input a first variable capacitor C2 and at the output a second variable capacitor C3, where said variable capacitors are adjusted to match the input and output impedance respectively of said amplifier U1 to allow said amplifier to be optimally adjusted to pass the 70 MHz signal from said band-pass filter F1 at a maximum gain, (c) a second 70 MHz band-pass filter F2 that receives and passes the amplified 70 MHz signal from said R.F. amplifier U1 through a coupling capacitor C4, (d) a self-contained frequency counting unit FC1 having a front panel and circuit means for receiving and processing the amplified 70 MHz signal from said second 70 MHz band pass filter and producing an output that drives a 10-digit LCD display that displays the operating frequency of said pager that is being adjusted by a person adjusting the frequency adjust control located on said pager, where on the front panel of said frequency counting unit FC1 is further located:

a POWER ON-OFF switch, a RANGE switch that allows frequencies from 1 MHz to 2.8 GHz to be selected, a frequency HOLD switch that when pressed, causes the LCD display to remain locked on the pager's operating frequency and a GATE switch that when pressed, increases the resolution of the displayed pager operating frequency, (c) a system enclosure that includes a front panel having a cavity opening that is dimensioned to receive and attach the upper surface of said pager cavity, where when attached, said pager cavity is exposed for use, with the front panel further having a set of counting unit openings corresponding to the dimensions of the digital display and switches located on the front panel of said frequency counting unit FC1, and (d) a power supply that supplies the required power to operate said electronics circuit.

13. The system as specified in claim 12 wherein said system is portable and is designed to be operated external to a certified screen room.

14. The system as specified in claim 12 wherein said frequency counting unit is powered by an internal battery.

15. The system as specified in claim 12 wherein said power supply comprises a 9-volt battery that is housed within said enclosure.

16. The system as specified in claim 12 wherein said power supply comprises:

a) said system enclosure having therethrough on a side panel, a male power connector that includes an inward, output section and an outward, input section where the output section is connected to an input terminal of a voltage regulator that further comprises an element of said electronics circuit, b) a wall-plug power adapter having:

(1) an input plug that is connected to an a-c utility power receptacle, and (2) an output cable having a female connector that attaches to the male power connector on said system enclosure, where when attached, d-c power is applied to said voltage regulator, which then supplies a regulated d-c voltage that is applied to said electronics circuit.

* * * * *